United States Patent
DeLuca

(10) Patent No.: US 9,582,144 B2
(45) Date of Patent: Feb. 28, 2017

(54) THREE-DIMENSIONAL, MULTI-DEPTH PRESENTATION OF ICONS ASSOCIATED WITH A USER INTERFACE

(75) Inventor: Michael Joseph DeLuca, Boca Raton, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 784 days.

(21) Appl. No.: 13/010,539

(22) Filed: Jan. 20, 2011

(65) Prior Publication Data

US 2012/0192114 A1    Jul. 26, 2012

(51) Int. Cl.
  *G06F 3/00*    (2006.01)
  *G06F 3/048*    (2013.01)
  *G06F 3/0481*    (2013.01)
  *G06F 3/0482*    (2013.01)

(52) U.S. Cl.
  CPC ........ *G06F 3/04817* (2013.01); *G06F 3/0482* (2013.01); *G06F 3/04815* (2013.01)

(58) Field of Classification Search
  CPC .......................... G06F 3/04817; G06F 3/04815
  See application file for complete search history.

(56) References Cited

U.S. PATENT DOCUMENTS

| | | | | |
|---|---|---|---|---|
| 4,875,034 A | * | 10/1989 | Brokenshire | ...... H04N 13/0434 345/419 |
| 5,452,414 A | * | 9/1995 | Rosendahl et al. | ........... 715/836 |
| 5,880,733 A | * | 3/1999 | Horvitz et al. | ............... 715/850 |
| 6,064,354 A | | 5/2000 | DeLuca | |
| 6,559,813 B1 | | 5/2003 | DeLuca et al. | |
| 7,119,819 B1 | * | 10/2006 | Robertson et al. | ........... 715/782 |
| 7,490,295 B2 | * | 2/2009 | Chaudhri et al. | ............. 715/764 |

(Continued)

FOREIGN PATENT DOCUMENTS

| | | |
|---|---|---|
| CN | 101055327 | 10/2007 |
| CN | 101065976 | 10/2007 |

(Continued)

OTHER PUBLICATIONS

Automatically Cycle Open Windows, Jun. 30, 2009, 6 pages.*

(Continued)

*Primary Examiner* — Yongjia Pan
(74) *Attorney, Agent, or Firm* — Jon Gibbons; Fleit Gibbons Gutman; Bongini & Bianco P.L.

(57) ABSTRACT

A three-dimensional display presents a plurality of icons that are associated with a user interface. These icons include at least a first icon presented at a first depth of presentation and at least a second icon presented at a second, different depth of presentation. By one approach this first icon is available for interaction by an input component of the user interface while the second icon is unavailable for interaction by the input component of the user interface. The aforementioned first depth of presentation may be substantially coincide with a surface, for example, a touch-sensitive display, of the corresponding electronic device. So configured, the first icon (which is presently available for selection) appears at a depth that coincides with that surface. This approach can serve to facilitate three-dimensional presentation of an icon based on whether it is available for interaction via an input component of a user interface.

21 Claims, 3 Drawing Sheets

(56) References Cited

U.S. PATENT DOCUMENTS

| | | | |
|---|---|---|---|
| 7,512,902 B2* | 3/2009 | Robertson et al. | 715/848 |
| 7,558,420 B2* | 7/2009 | Era | 382/154 |
| 7,562,312 B2* | 7/2009 | Rochford et al. | 715/848 |
| 7,624,339 B1* | 11/2009 | Engel et al. | 715/214 |
| 7,954,064 B2* | 5/2011 | Forstall et al. | 715/779 |
| 8,050,492 B2* | 11/2011 | Bae et al. | 382/154 |
| 8,291,332 B2* | 10/2012 | Chaudhri et al. | 715/764 |
| 8,321,801 B2* | 11/2012 | Chaudhri et al. | 715/765 |
| 8,416,276 B2* | 4/2013 | Kroll et al. | 348/14.02 |
| 8,566,732 B2* | 10/2013 | Louch et al. | 715/764 |
| 8,760,448 B2* | 6/2014 | Lee et al. | 345/419 |
| 8,869,027 B2* | 10/2014 | Louch | G06F 3/0481 715/700 |
| 8,954,871 B2* | 2/2015 | Louch | 715/764 |
| 2001/0028369 A1* | 10/2001 | Gallo et al. | 345/848 |
| 2002/0036617 A1* | 3/2002 | Pryor | 345/156 |
| 2004/0261038 A1* | 12/2004 | Ording | G06F 3/0481 715/792 |
| 2005/0002074 A1* | 1/2005 | McPheters et al. | 359/15 |
| 2005/0254702 A1* | 11/2005 | Era | 382/154 |
| 2006/0236251 A1* | 10/2006 | Kataoka | G06F 3/0481 715/757 |
| 2007/0070066 A1* | 3/2007 | Bakhash | G06F 3/04815 345/419 |
| 2007/0101297 A1* | 5/2007 | Forstall et al. | 715/841 |
| 2007/0165027 A1* | 7/2007 | Nakadaira et al. | 345/426 |
| 2008/0034314 A1* | 2/2008 | Louch et al. | 715/778 |
| 2008/0082937 A1* | 4/2008 | Bennah | G06F 3/0481 715/781 |
| 2008/0161997 A1* | 7/2008 | Wengelnik et al. | 701/36 |
| 2008/0231926 A1* | 9/2008 | Klug et al. | 359/23 |
| 2009/0158193 A1* | 6/2009 | Chaudhri | G06F 3/0481 715/779 |
| 2009/0160931 A1 | 6/2009 | Pockett et al. | |
| 2009/0228827 A1* | 9/2009 | Robertson et al. | 715/782 |
| 2009/0256809 A1* | 10/2009 | Minor | 345/173 |
| 2010/0064212 A1 | 3/2010 | Snyder | |
| 2010/0115455 A1* | 5/2010 | Kim | 715/781 |
| 2010/0138295 A1* | 6/2010 | Caron | G06Q 30/02 705/14.49 |
| 2010/0194705 A1* | 8/2010 | Kim et al. | 345/173 |
| 2010/0253766 A1* | 10/2010 | Mann et al. | 348/51 |
| 2010/0277420 A1 | 11/2010 | Charlier et al. | |
| 2011/0093778 A1* | 4/2011 | Kim et al. | 715/702 |
| 2011/0126141 A1* | 5/2011 | King et al. | 715/769 |
| 2012/0009981 A1* | 1/2012 | Bengtsson | 455/566 |
| 2012/0287044 A1* | 11/2012 | Bell et al. | 345/158 |
| 2013/0125007 A1* | 5/2013 | Chaudhri | G06F 3/0481 715/738 |

FOREIGN PATENT DOCUMENTS

| | | |
|---|---|---|
| CN | 101097498 | 1/2008 |
| CN | 101266546 | 9/2008 |
| CN | 101495951 | 7/2009 |
| EP | 1667471 A1 | 6/2006 |
| EP | 1873702 | 1/2008 |
| EP | 1873702 A1 | 1/2008 |

OTHER PUBLICATIONS

PCT Search Report from related PCT/US2011/021893; Apr. 19, 2011; 5 pages.

No author; "3D iPhone Apps, Games, and Movies is Possible with a 3D Screen," from http://www.theappsmachine.com/iphone-news-and-rumors/3d-iphone-apps-games-and-movies-is-possible-with-a-3d-screen/; Dec. 8, 2008; 2 pages.

Flynn, Conor; "Samsung W960 is the first AMOLED 3D Display Phone," http://www.slipperybrick.com/2010/05/samsung-w960-is-the-first-amoled-3d-displayphone/; May 9, 2010; 4 pages.

Baudisch, Patrick et al.; "Back-of-Device Interaction Allows Creating Very Small Touch Devices," submitted to CHI 2009, Apr. 2005; Copyright 2006; 10 pages.

Hiraoka, Shigeo et al.; "Behind Touch: Backside Keys with Tactile Sense Interface for Mobile Phones," Transactions of Information Processing Society of Japan; vol. 44, No. 11, Nov. 2003; 8 pages.

Stevens, Tim; "Next Gen PSP to have touch controls—on the wrong side?" from http://www.engadget.com/2010/08/19/next-gen-psp-to-have-touch-controls-on-the-wrong-side/; Aug. 19, 2010; 1 page.

Hollister, Sean; "Sony fires barrage of touchscreen patent applications, only one points at new PSP," from http://www.engadget.com/2010/11/28/sony-fires-barrage-of-touchscreen-patent-applications-only-one/; Nov. 28, 2010; 1 page.

Wong, SY; Spatial View's 3DeeSlide App Enables 3D View on iPhone/iPad and Android Smartphones from http://www.mydigital-life.info/2010/09/26/spatial-views-3deeslide-app-enables-3d-view-on-iphoneipad-and-android-smartphones/; Sep. 26, 2010; 2 pages.

van der Klein, Raimo; Layar Reality Browser; originally available at http://layar.com/3d; retrieved from http://web.archive.org/web/20091028061839/http://layar.com/3d/; 2009; 4 pages.

Wigdor, Daniel et al.; "LucidTouch: A See-Through Mobile Device;" from http://www.youtube.com/user/newscientistvideo#p/u/4601aASuL7RHJHM; Oct. 11, 2007; video transcribed Jul. 12, 2011.

Paul, Franklin; "Nintendo Shows Off 3D Portable Game Device," from http://www.reuters.com/article/2010/06/15/us-e3-nintendo-idUSTRE65E4LP20100615?type=technologyNews; Jun. 15, 2010; 1 page.

Article 94(3) EPC from related European Patent Application No. 11704343.0 dated Oct. 31, 2014; 7 pages.

Canadian Office Action from related Canadian Patent Application No. 2,825,101 dated Nov. 28, 2014; 3 pages.

Article 94(3) EPC from related European Patent Application No. 11704343.0 dated May 22, 2014; 3 pages.

Korean Office Action from related Korean Patent Application No. 10-2013-7021912 dated May 27, 2014; 5 pages.

Korean Office Action from related Korean Patent Application No. 10-2013-7021912 dated Nov. 27, 2014; 3 pages.

European Examination Report dated Mar. 23, 2015 for European Application No. 11704343.0.

Extended European Search Report dated Aug. 30, 2016, received for European Application No. 16176227.3.

Chinese Office Action dated Sep. 17, 2015, received for Chinese Application No. 201180069411.0.

Chinese Office Action dated Jul. 19, 2016, received for Chinese Application No. 201180069411.0.

* cited by examiner

THREE-DIMENSIONAL, MULTI-DEPTH PRESENTATION OF ICONS ASSOCIATED WITH A USER INTERFACE

RELATED APPLICATION(S)

This application is related to U.S. patent application Ser. No. 13/010,580, entitled THREE-DIMENSIONAL, MULTI-DEPTH PRESENTATION OF ICONS IN ASSOCIATION WITH DIFFERING INPUT COMPONENTS OF A USER INTERFACE and filed on even date herewith, the content of Which is incorporated by reference in its entirety herein.

TECHNICAL FIELD

This disclosed concept relates generally to the presentation of icons associated with a user interface and more particularly to the use of three-dimensional displays in these regards.

BACKGROUND

Graphical user interface and displayed icons are known in the art. Generally speaking, icons each serve to represent a corresponding program, process, application, function, capability, media file, Internet address, personal information management (PIM) record, or the like. In many cases a plurality of such icons are presented using, for example a touch-sensitive display.

As various devices become ever more capable, and as the device users themselves expect an ever-increasing number of capabilities from their devices, it is not unusual for a device's display to be of insufficient size to adequately and simultaneously present all or even most of the icons with which that device is provisioned. To accommodate such a circumstance many such devices utilize scrolling to present only a subset of the provisioned icons. This scrolling serves to remove some icons from the display while moving other icons onto the display.

Figure 1:
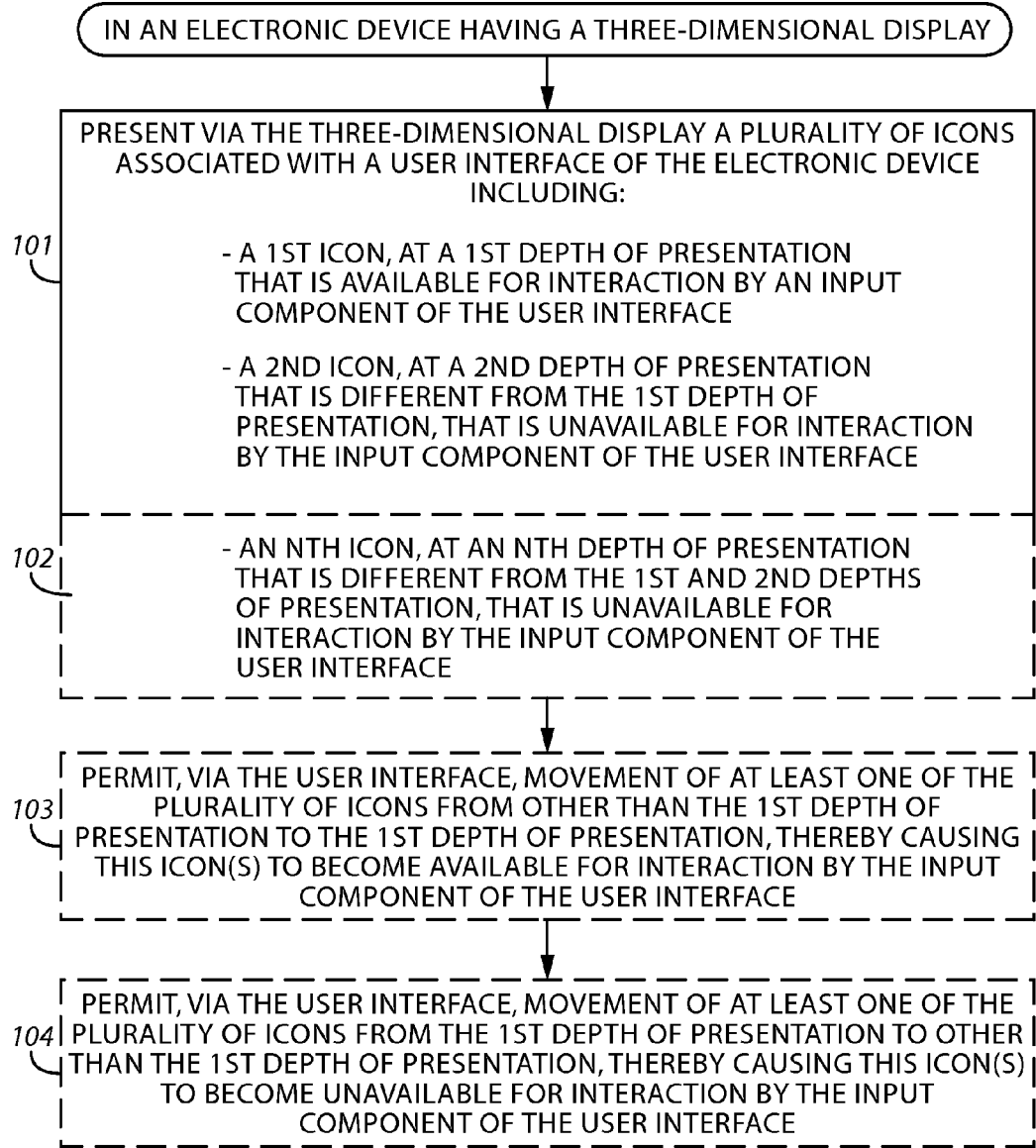
FIG. 1 comprises a flow diagram as configured in accordance with various embodiments of the disclosed concept.

Elements in the figures are illustrated for simplicity and clarity and have not necessarily been drawn to scale. For example, the dimensions, relative positioning, or both of some of the elements in the figures may be exaggerated relative to other elements to help to improve understanding of various embodiments of the disclosed concept. Also, common but well-understood elements that are useful in a commercially feasible embodiment may be omitted from the figures in order to facilitate a less obstructed view of these various embodiments of the disclosed concept.

DETAILED DESCRIPTION

The present disclosure describes a user interface that employs a three-dimensional display. In this disclosure, a three-dimensional (3D) display is any display apparatus capable of conveying a stereoscopic perception of 3D depth to a viewer, and may hereafter be referred to as a "display" or "stereoscopic display" for the sake of brevity. It should be understood that a three-dimensional display may, by one approach, utilize dual two dimensionally displayed images (one for each eye of the viewer) to create a virtual three-dimensional image. The generation of a virtual three-dimensional image or icon using a 3D display may be referred to as "presenting" the image because the image may be perceived by the viewer to appear at various distances from the viewer without regard to the physical location of the 3D display apparatus. In this disclosure, "presenting" refers to the use of a three-dimensional display to cause the display of one or more components of an image, such the displayed components create the appearance of a single image perceived by an observer. An image presented at a specific depth of presentation may comprise multiple components of the image that may be mentally combined by the observer to create the appearance of a single image at a depth of presentation (e.g., at a perceived distance) from the observer.

The three-dimensional display serves to present a plurality of icons that are associated with the user interface. The plurality of icons include at least a first icon presented at a first depth of presentation and at least a second icon presented at a second, different depth of presentation. By one approach this first icon is available for interaction by an input component of the user interface while the second icon is unavailable for interaction by the input component of the user interface. This approach facilitates presentation of icons using the three-dimensional display, where only some icons are available for interaction via a particular input component of the user interface.

In this disclosure, an icon that is available for interaction by an input component of a user interface is one that can be selected to invoke a corresponding program, process, application, function, capability, media file, Internet address, personal information management (PIM) record, or the like. An icon that is unavailable for interaction by an input component is said to be presently unavailable for selection, even though the icon may be presented in an incapacitated or inoperative state. In other words, an icon is presented to a viewer (for example, to make the viewer aware of its presence), and is either available or unavailable for selection by interacting with a particular input component. It should be understood that an icon that is unavailable for interaction with a first input component may still be available for interaction with a second input component of the user interface.

In this description, the first input component of the user interface provides for interaction with icons presented at the first depth of presentation. For example, the input component may be a touch-sensitive display, a mouse, a touchpad, a track pad, an electronic pen, a user-interface glove, or other input component configured to allow selection of icons (e.g., available for interaction) presented at the first depth of presentation. The first depth of presentation may be perceived by the viewer to be associated with a selection capability of the input component, while icons (e.g. unavailable for interaction) presented at a second, different depth of presentation may be perceived by the viewer to be unassociated with the selection capability of the input component.

By one approach the aforementioned first depth of presentation can substantially coincide with a surface (such as a control surface) of an electronic device. So configured, the first icon (which is presently available for interaction by an input component of the user interface) appears at a depth of presentation that coincides with the surface. This may be done by presenting the left and right eye images for the first icon at substantially a same location on the three-dimensional display, or by presenting left and right eye images that are substantially identical to each other. When the surface comprises, for example, a touch-sensitive display (as the input component), this approach can facilitate use of the touch-sensitive display when selecting a particular icon that is presented in substantial coincidence with the touch-sensitive display.

So configured, an electronic device may present many (or even all) of the icons with which that device is provisioned, notwithstanding that the physical two-dimensional boundaries of the display apparatus may otherwise be too small to two-dimensionally display all of the provisioned icons. This is because some of the icons can be presented at depths of presentation other than the physical depth of the display apparatus itself.

The disclosed concept may prevent inadvertent assertion of at least some of the icons by limiting selection capability in the user interface to, for example, only icons available for interaction by a particular input component of the user interface. When the icons that are available for interaction are perceived to be associated with a selection capability of the input component or are perceived to coincide in space with the selection capability of the input component, the overall effect is highly intuitive and ergonomically sensible.

These teachings will readily accommodate providing other icons at yet other depths of presentation if desired. As a simple illustrative example in these regards, some icons can be presented at a depth that is perceived to be above the display (i.e., between the display apparatus and the viewer) while other icons are presented at a depth that is perceived to be below the display (i.e., at a depth that is further from the viewer than the display apparatus). This may be done by presenting differing left and right eye images for such icons (e.g. at slightly offset locations) on the three-dimensional display to create the perception of icons at depths above or below the display. In other words, icons may be presented at depths that are perceived to be closer or farther than the physical structure of the display. Icons that are presented at a depth other than the first depth of presentation may be unavailable for interaction by an input component associated with the first depth of presentation.

These teachings will also readily accommodate movement of at least some of the icons from one depth of presentation to another. For example, a user-interface instruction may provide the ability to rearrange the perceived depths of icons, thereby moving icons into a perceived depth allowing interaction with the icons by the input component and moving other icons to a perceived depth making the other icons unavailable for interaction by the input component. Using this approach, for example, an icon that is presently unavailable for interaction by an input component can be moved to a depth of presentation at which the icon becomes presently available for interaction by the input component.

The teachings of this disclosure are particularly well suited to use with devices/displays that, by their very size or form factor, provide an insufficient amount of physical structure to implement a user interface that reasonably accommodates the device's assortment of capabilities. Those skilled in the art will appreciate that these teachings can be implemented in a variety of commercially viable ways. It will further be appreciated that these teachings are highly scalable and can be used with a variety of differently-sized user interfaces, icons, electronic devices, and so forth. These and other benefits may become clearer upon making a thorough review and study of the following detailed description.

Referring now to the drawings and in particular to FIG. 1, an illustrative process 100 that is compatible with many of these teachings will be described. In this illustrative example, an electronic device carries out the described process 100. Electronic devices referred to in this disclosure may include, for example, portable electronic devices, simple cellular telephones, smart telephones, wireless personal digital assistants (PDAs), laptop computers, tablets, portable gaming devices, televisions, monitors, or other electronic devices. For the purposes of this description the electronic device has at least one three-dimensional display such as, but not limited to, a stereoscopic display.

The expression "three-dimensional active display" may refer to a physically two-dimensional active display (such as a liquid-crystal display or a light-emitting diode display) that is capable of portraying a virtual three-dimensional image (either alone or in conjunction with, for example, special lenses through which the viewer gazes at the display). For example, a three-dimensional display comprising a stereoscopic display may present offset images that are displayed separately to the left and right eyes. Both of these 2D offset images are then mentally perceived by the viewer as a single 3D image. Examples of this technology include anaglyph images and polarized glasses. Autostereoscopic display technologies may use optical components in the display, rather than spectacles worn by the viewer, to enable each eye to see a different image. In another example, a three-dimensional display comprising a holographic display may utilize interference of coherent light to create a light field identical to that which would emanate from an image at a particular depth of perception. Still further examples of technologies suitable for three-dimensional displays may include volumetric displays, lenticular displays, or free-space displays.

Various three-dimensional displays are known in the art and other approaches will likely be developed going forward. It should be understood that three-dimensional displays in this disclosure may comprise any display apparatus capable of conveying the appearance of an icon at various depths of perception. As the present teachings are not particularly sensitive to any specific choices in these regards, further elaboration here will not be provided for the sake of brevity.

At step 101 this process 100 provides for presenting, via the aforementioned three-dimensional display, a plurality of icons. These icons are associated with a user interface that corresponds to the electronic device. For example, these icons represent an associated program, process, data, or other application that are, at least under some circumstances, selectable by an input component of the user interface. For the sake of illustration and not by way of limitation, a particular icon may be associated with any of a variety of applications (i.e., so-called "apps").

Figure 2:
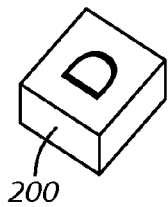
FIG. 2 comprises a perspective schematic view as configured in accordance with various embodiments of the disclosed concept.

By one approach, at least some of these icons can comprise two-dimensional images. If desired, however, and continuing to presume upon the capabilities of the three-dimensional display, one or more of these icons can themselves comprise a three-dimensional image. Referring momentarily to FIG. 2, a simple illustrative example in these regards comprises a virtual three-dimensional button that presents a corresponding icon (here, the alphabetic character "D").

Returning again to FIG. 1, at step 101 this presentation of icons includes presenting at least a first icon and a second icon where these icons are presented at differing depths of presentation. That is, to a viewer of the display who is able to discern the three-dimensional content thereof, one of these depths of presentation will appear, for example, to be closer to the viewer than the other.

Figure 3:
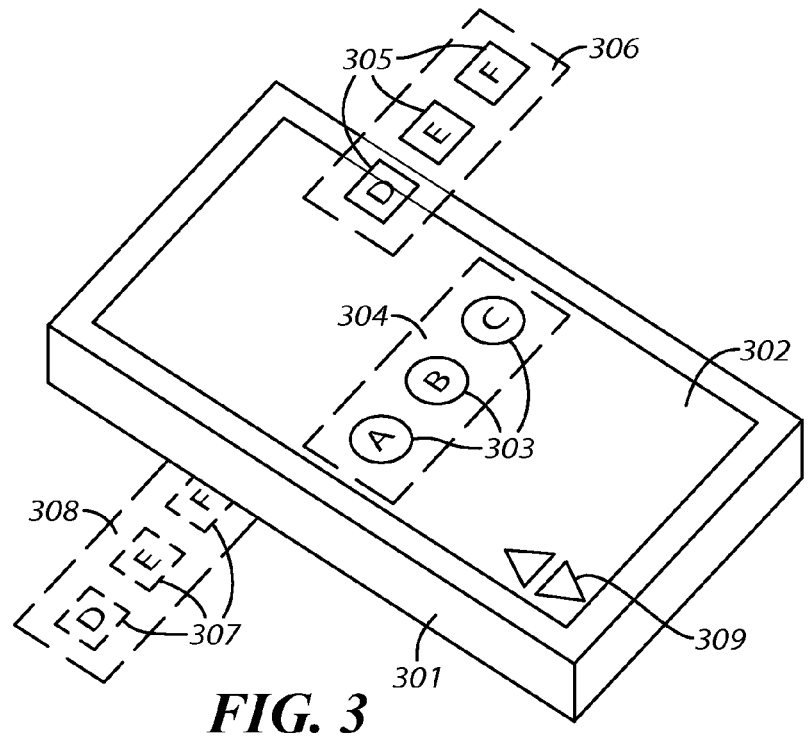
FIG. 3 comprises a perspective schematic view as configured in accordance with various embodiments of the disclosed concept.

FIG. 3 provides an illustrative example in these regards. In this example the electronic device 301 of interest has a three-dimensional touch-screen display 302. This display 302 presents a first group of icons 303 at a first depth of presentation 304 and a second group of icons 305 at a second, different depth of presentation 306. In this particular example it may be noted that the first depth of presentation 304 also substantially coincides with a surface of the electronic device 301 (i.e., the outer surface of the display 302). Accordingly, the first group of icons 303 that are presented at that first depth of presentation 304 also at least substantially coincide visually with that surface.

The difference in distance between these two depths of presentation 304 and 306 can vary according to design considerations of the user interface and electronic device. In particular, the distance can be as subtle, or as striking, as may suit the needs or opportunities as tend to characterize a particular user interface.

It will also be understood that the displayed icons can be laterally offset from one another as desired. For example, by one approach, the icons appearing at differing depths of presentation can be substantially coincident such that they appear to be layered, offset, or even stacked one above the other. In such a case it may be useful to present at least the higher-level icons in a transparent or translucent manner to permit lower-level icons to be readily perceivable by the viewer. As another example, and again as desired, the icons appearing at differing depths of presentation can be laterally offset from one another to avoid having icons at higher levels occluding part or all of the icons that appear at lower depths of presentation.

Referring still to both FIGS. 1 and 3, the icons presented at the first depth of presentation (these being the icons 303 in FIG. 3 that are coincident with the surface of the electronic device 301) are available for interaction via an input component of the user interface. Conversely, the icons presented at the second depth of presentation (these being the icons 305 in FIG. 3 that are not coincident with the surface of the electronic device 301) are unavailable for interaction by the input component of the user interface. (As used herein, "interaction" shall be understood to comprise asserting or identifying an icon in order to activate (or return to) a corresponding capability as a direct consequence and result of having so chosen or identifying that icon.)

This availability and unavailability to interact with an icon using an input component can be intuitively understood by the viewer. In particular, the input component may provide for interaction only with icons presented at the first depth of presentation, and may not provide for interaction with icons presented at other depths of presentation. For example, using FIG. 3, the icons 303 may be presented at a depth of presentation 304 that at least substantially coincides with a touch-sensitive surface of the display 302, and are available for interaction by the touch-sensitive surface. The icons 303 are readily understood as being invoked by merely touching the touch-sensitive surface of the display 302 at the location in which the icon 303 is presented. Conversely, the icons 305 being presented at the second depth of presentation 306 are not coincident with the touch-sensitive surface and are unavailable for interaction by the touch-sensitive surface. Attempts to touch icons 305 will not result in physical contact with the touch-sensitive surface and hence will not result in invoking the item associated with such an icon.

In the illustrative examples described above the three-dimensional display employs two different depths of presentation, one depth of presentation having one or more icons that are available for interaction via an input component of the user interface and the other depth of presentation having one or more icons that are unavailable for interaction by that input component. These teachings will readily support, however, optionally using additional depths of presentation for other icons as desired. As illustrated in FIG. 1, this can comprise the optional step 102 of using up to N depths of presentation (where "N" comprises an integer greater than "2") that are different from the aforementioned first and second depths of presentation. In such a case, for example, any icons presented at these additional depths of presentation can also comprise icons that are presently unavailable for interaction via the input component of the user interface.

Accordingly, by employing this optional approach, the display can contemporaneously present: (1) one or more icons at a first depth of presentation (which may at least substantially coincide with an input component of a user interface of the corresponding electronic device) that are available for interaction via the input component, (2) one or more icons at a second, different depth of presentation that are not available for interaction via the input component, and (3) one or more icons at a third (or more) depth of presentation (that is different from both the first and second depths of presentation) that are also not available for interaction via the input component. Referring again momentarily to FIG. 3, for example, these latter icons 307 and their corresponding third depth of presentation 308 can appear to be behind the electronic device 301, though any number of other possibilities can be readily accommodated.

Those skilled in the art will recognize and understand that there are no particular limitations in these regards as to how many icons are presented nor how many different depths of presentation are employed in a particular implementation. These teachings will also accommodate providing more than one cluster of grouped icons at a given, shared depth of presentation if desired. For example, a first group of three icons could be presented at one portion of any of the depicted depths of presentation and a second group of icons could also be presented at a different, removed portion of that same depth of presentation.

For many implementations it may be useful to move these icons from one depth of presentation to another. By one approach this could occur automatically. For example, and presuming for the sake of simplicity that there are only two depths of presentation in the example, a first icon could be presented at the first depth of presentation for a predetermined period of time (such as five seconds, one minute, or such other period of time as may be desired). This first icon could then be automatically moved to the second depth of presentation. By one approach this icon could continue to automatically shift back and forth between these two depths of presentation in such a manner. In such a case, and presuming for the sake of example a fifty-percent duty cycle, this icon would be available for present selection by the user about half the time (as the icon would occupy the depth of presentation that corresponds to being available about half the time).

It should be understood that a user interface may disable, restrain, ignore, treat, or otherwise make icons presented at the second depth of presentation unavailable for interaction with a particular input component of the user interface. By one approach, the user interface may refrain from responding to a detected input associated with a disabled icon at the input component. Icons that are presented at the second depth of presentation may be considered unavailable by virtue of the type of input component. For example, where the input component is a touch-sensitive surface of the electronic devices, icons that are presented at the depth of presentation associated with the touch-sensitive surface are available for selection by detecting a touch on the touch-sensitive service (e.g., touching the surface at a location where the icon is presented). Icons presented above or below the touch-sensitive surface may be said to be made unavailable, disabled, or treated as unavailable due to the inability to detect a touch associated with such an icon.

These teachings will also accommodate, if desired, optionally permitting via the user interface selectively effecting such movement. The aforementioned electronic device 301, for example, could provide a further input component 309 of the user interface to permit control over such movement. The further input component may comprise a button, key, scroll wheel, track pad, touch pad, portion of a touch-sensitive display, or other control surface. Alternatively, the further input component may comprise an accelerometer, gyroscope, proximity sensor, camera, or other apparatus capable of detecting a change in the environment, where the change is associated with a command to effect such movement. These teachings will accommodate other approaches in these regards as well, as desired. For example, when the electronic device has a user interface that supports gesture recognition, a user gesture can suffice to effect the desired icon movement. As another example in these regards, when the electronic device has a user interface that supports voice recognition, a particular spoken instruction can similarly suffice in these same regards. As yet another example in these regards, when the electronic device has a user interface that supports an accelerometer, a movement of the electronic device toward or away from the viewer may be used to change the enablement or disablement property of icons at various depths of perception (e.g., enabling the icons at the depth of perception which the electronic device physically occupies).

Referring again to FIG. 1, at optional step 103, this process 300 can permit (for example, using an instruction in the input component of the user interface, or using a further input component of the user interface) movement of at least one of the plurality of icons from other than the first depth of presentation to the first depth of presentation. This could comprise, for example, moving a selected icon or all of the icons (as a group) from the second depth of presentation to that first depth of presentation. As described above, this will cause the moved icon(s) to become available for interaction by the input component of the user interface (as it is the first depth of presentation in this illustrative embodiment that contains the presently available icons).

This process 100, at optional step 104, can also facilitate an opposite action; that is, moving at least one of the plurality of icons from the first depth of presentation to other than the first depth of presentation (such as, for example, to the aforementioned second depth of presentation). This, of course, will cause the moved icons to become presently unavailable for interaction by the input component of the user interface. By one approach, these two steps 103 and 104 can occur functionally simultaneously. In this case, as icons are being moved from the second depth of presentation to the first depth of presentation, the icons at the first depth of presentation are being moved to the second depth of presentation.

Figure 4:
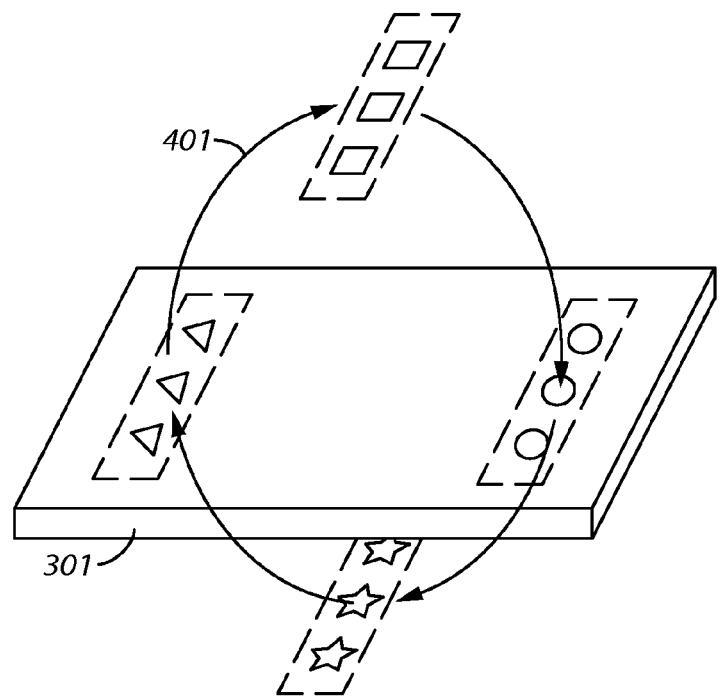
FIG. 4 comprises a perspective schematic view as configured in accordance with various embodiments of the disclosed concept.

This movement of icons can occur in a visually step-wise manner if desired. Using this approach, the icons will simply disappear from one depth of presentation and appear at another. Using another approach, a more fluid, animated technique can serve to cause the icons to visually appear to traverse a particular path when moving from one depth of perception to another. When using an animated path approach, the path can comprise a shortest-distance between the two depths of presentation or can represent a path having some shape of interest. For example, and referring momentarily to the illustrative example provided by FIG. 4, the path 401 could comprise an arc, circle, or other non-linear shape of choice. These teachings will also accommodate having each icon traverse an independent and different path shape as compared to other icons that are moving from the same depth of presentation if desired.

This movement of icons from one depth of presentation to another can be accompanied by other visual events if desired. These teachings will also accommodate rendering audio content of interest while moving the icons from one depth to another if desired.

Figure 5:
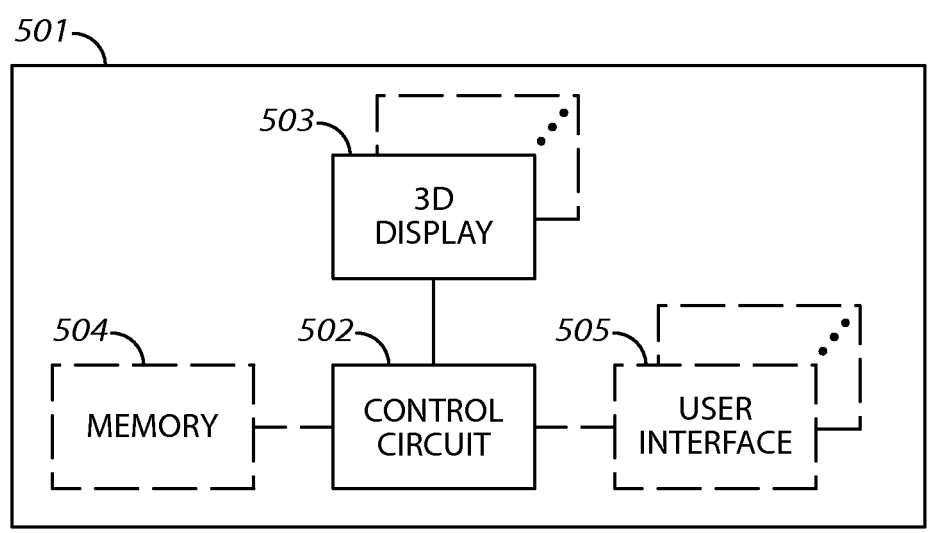
FIG. 5 comprises a block diagram as configured in accordance with various embodiments of the disclosed concept.

The above-described processes are readily enabled using any of a wide variety of available, readily-configured platforms, including partially or wholly programmable platforms as are known in the art or dedicated purpose platforms as may be desired for some applications. Referring now to FIG. 5, an illustrative approach to such a platform is described.

In this illustrative example the enabling platform 501 comprises a portable electronic device. As explained above, however, any number of devices can readily serve in these same regards as desired. This platform 501 comprises, at least in part, a control circuit 502 that operably couples to one or more three-dimensional displays 503. Such a control circuit 502 can comprise a fixed-purpose hard-wired platform or can comprise a partially or wholly programmable platform as desired. This control circuit 502 is configured (for example, by corresponding programming as will be well understood by those skilled in the art) to carry out one or more of the features described herein. For example, programming executed by the control circuit 502 may cause the electronic device to:

use the three-dimensional display 503 to present a virtual three-dimensional scene comprising a plurality of icons, including at least a first icon presented at a first depth of presentation and a second icon presented at a second depth of presentation, where the first and second depths of presentation are different from one another;

wherein the first icon at the first depth of presentation is available for interaction by an input component of the user interface; and wherein the second icon at the second depth of presentation is unavailable for interaction by the input component of the user interface.

All of these architectural options regarding fixed-purpose designs as well as partial and full programmability are well known and understood in the art and require no further description here.

By one approach this platform 501 can further comprise a memory 504 that operably couples to the control circuit 502 (or, if desired, comprises a part thereof). This memory can serve to store content to be displayed by the three-dimensional display 503 (such as one or more of the icons contemplated herein). When the control circuit 501 comprises a component that is at least partially programmable, this memory 504 can also serve to store the instructions to be carried out by the control circuit 501.

This platform 501 can also comprise one or more user interfaces 505. By one approach such a user interface can comprise a touch-sensitive capability that may comprise a part of one or more of the aforementioned three-dimensional displays 503. This user interface 505 can also accommodate other modalities of interaction as desired, however. For example, this user interface 505 can comprise as well a gesture-recognition interface, a speech-recognition interface, physical (as versus virtual) buttons, switches, scroll wheels, track pads and other touch-sensitive surfaces, cameras, accelerometers, gyroscopes, proximity sensors, or the like, and so forth.

Such an apparatus 500 may be comprised of a plurality of physically distinct elements as is suggested by the illustration shown in FIG. 5. It is also possible, however, to view this illustration as comprising a logical view, in which case one or more of these elements can be enabled and realized via a shared platform.

So configured, an electronic device having a three-dimensional display capability can simultaneously present, in a useful and intuitive manner, more icons than could otherwise reasonably be contemporaneously presented in the physical area of the three-dimensional display. Presuming the availability of the three-dimensional display itself, these teachings can be readily implemented in highly cost-effective ways and often without requiring other dedicated physical components.

In one approach, the present disclosure provides a method and apparatus for presenting via the three-dimensional display a plurality of icons associated with a user interface of the electronic device, the plurality of icons including a first icon presented at a first depth of presentation and a second icon presented at a second depth of presentation different from the first depth of presentation, making the first icon at the first depth of presentation available for interaction by an input component of the user interface, and making the second icon at the second depth of presentation unavailable for interaction by the input component of the user interface. In another approach, the method may comprise enabling the first icon at the first depth of presentation for interaction by the input component of the user interface, and disabling the second icon at the second depth of presentation for interaction by the input component of the user interface.

In yet another approach, the present disclosure provides a method and apparatus for presenting via a three-dimensional display a first icon at a first depth of presentation associated with a user input of a user interface, presenting via the three-dimensional display a second icon at a second depth of presentation not associated with the user input of the user interface, and receiving a selection of the first icon via the user input, wherein the second icon is presently unavailable for interaction by the input component.

The present teachings disclose a user interface having an input component that provides for interaction with icons that are presented at a first depth of presentation, and that does not provide for interaction with icons that are presented at depths of presentation other than the first depth of presentation.

It should be understood that the terms and expressions used herein have the ordinary technical meaning as is accorded to such terms and expressions by persons skilled in the technical field as set forth above except where different specific meanings have otherwise been set forth herein. Certain actions or steps may be described or depicted in a particular order of occurrence while those skilled in the art will understand that certain actions or steps may be performed in a variety of sequences without departing from the scope of the present disclosure.

Those skilled in the art will recognize that a wide variety of modifications, alterations, and combinations can be made with respect to the above described embodiments without departing from the scope of the disclosed concept, and that such modifications, alterations, and combinations are to be viewed as being within the ambit of the inventive concepts disclosed herein.

We claim:

1. A method in an electronic device having a touch-sensitive input component and a display apparatus capable of conveying a stereoscopic perception of three dimensional depth to a viewer, the method comprising:
   concurrently presenting a plurality of icons in a multi-depth virtual three dimensional image via the display apparatus on a user interface of the electronic device, the plurality of icons including a first icon presented at a first depth of presentation that is at least substantially coincident with a surface of the touch-sensitive input component and a second icon presented at a second depth of presentation that is different from the first depth of presentation and substantially not coincident with the surface of the touch-sensitive input component; and
   automatically switching at least some of the plurality of the icons from one depth of presentation allowing interaction to another depth of presentation disabling interaction, within the user interface, by
      moving the first icon at the first depth of presentation to the second depth of presentation; and
      moving the second icon at the second depth of presentation to the first depth of presentation;
   wherein automatically switching the at least some of the plurality of icons occurs after a predetermined period of time; and
   wherein only icons at the first depth of presentation coincident with the surface of the touch-sensitive input component are available for user interaction by the touch-sensitive input component and icons at other than the first depth of presentation are unavailable for user interaction and an icon that is unavailable for interaction with the touch-sensitive input component is available for interaction with a second input component for further facilitating the user interface, the second input component comprising at least one of a keypad, a keyboard, and a button.

2. The method of claim 1 wherein presenting via the display apparatus the plurality of icons comprises:
   presenting a third icon at a third depth of presentation.

3. The method of claim 2 wherein the first depth of presentation appears between the second depth of presentation and the third depth of presentation.

4. The method of claim 1 further comprising:
   responsive to an instruction, permitting, via the user interface, movement of at least one of the plurality of icons from other than the first depth of presentation to the first depth of presentation, thereby causing said at least one of the plurality of icons to become available for interaction by the touch-sensitive input component of the user interface.

5. The method of claim 4 further comprising:
receiving via the user interface a user interface gesture; and
moving the second icon from the second depth of presentation to the first depth of presentation in response to the user interface gesture that was received, thereby causing the second icon to become available for interaction by the touch-sensitive input component of the user interface.

6. The method of claim 5 further comprising:
moving the first icon from the first depth of presentation to the second depth of presentation in response to the user interface gesture that was received, thereby causing the first icon to become unavailable for interaction by the touch-sensitive input component of the user interface.

7. The method of claim 4 wherein permitting the movement of at least one of the plurality of icons comprises moving the icons currently at other than the first depth of presentation as a group to the first depth of presentation.

8. The method of claim 1 wherein at least one of the plurality of icons comprises a three-dimensional image.

9. The method of claim 1 further comprising:
receiving via the touch-sensitive input component a user interface gesture indicative of a selection of the first icon; and
invoking a process associated with the first icon.

10. The method of claim 1 wherein automatically switching at least some of the plurality of the icons comprises using an animated technique presenting the icons as a group traversing a same path together when moving from one depth of presentation to another.

11. The method of claim 10 wherein the path forms a non-linear shape of interest comprising an arc.

12. An apparatus comprising:
a control circuit;
a user interface; and
a display apparatus capable of conveying a stereoscopic perception of three dimensional depth to a viewer operably coupled to the control circuit;
wherein the control circuit is configured to:
cause the display apparatus to concurrently present a plurality of icons in a virtual multi-depth presentation of a three-dimensional scene on a user interface, including at least a first icon presented at a first depth of presentation that is at least substantially coincident with a surface of a touch-sensitive input component of the user interface and simultaneously present a second icon presented at a second depth of presentation that is different from the first depth of presentation and substantially not coincident with the surface of the touch-sensitive input component; and
automatically switch at least some of the plurality of the icons from one depth of presentation allowing interaction to another depth of presentation disabling interaction, within the user interface, by:
moving the first icon at the first depth of presentation to the second depth of presentation; and
moving the second icon at the second depth of presentation to the first depth of presentation;
wherein automatically switching the at least some of the plurality of icons occurs after a predetermined period of time;
wherein the touch-sensitive input component provides for interaction with icons that are presented at the first depth of presentation coincident with the surface of the touch-sensitive input component; and
wherein the touch-sensitive input component disables interaction with icons that are presented at depths of presentation other than the first depth of presentation and an icon that is unavailable for interaction with the touch-sensitive input component is available for interaction with a second input component for further facilitating the user interface, the second input component comprising at least one of a keypad, a keyboard, and a button.

13. The apparatus of claim 12 wherein the apparatus comprises a portable electronic device.

14. The apparatus of claim 12 wherein the display apparatus comprises, at least in part, a touch-sensitive display.

15. The apparatus of claim 12 wherein, responsive to an instruction, the control circuit is configured to permit movement of the plurality of icons amongst the depths of presentation to thereby select which of the plurality of icons are available for interaction by the touch-sensitive input component of the user interface.

16. The apparatus of claim 15, further comprising:
a second input component of the user interface, wherein the second input component is capable of detecting a change;
wherein the control circuit is configured to move ones of the plurality of icons amongst the depths of presentation in response to a detected change at the second input component.

17. The apparatus of claim 16, wherein the second input component of the user interface comprises at least one of a button, key, scroll wheel, track pad, touch pad, touch-sensitive surface, camera, accelerometer, gyroscope, and proximity sensor.

18. The apparatus of claim 15 wherein permitting the movement of the plurality of icons comprises moving the icons currently at other than the first depth of presentation as a group to the first depth of presentation.

19. The apparatus of claim 12 wherein at least one of the first icon and second icon comprises a three-dimensional image.

20. The apparatus of claim 12 wherein the control circuit automatically switches at least some of the plurality of the icons after a predetermined period of time using an animated technique presenting the icons as a group traversing a same path together when moving from one depth of presentation to another.

21. The apparatus of claim 20 wherein the path forms a non-linear shape of interest comprising an arc.

* * * * *